No. 700,502. Patented May 20, 1902.
H. T. JONES.
SEAL LOCK.
(Application filed July 25, 1901.)
(No Model.)
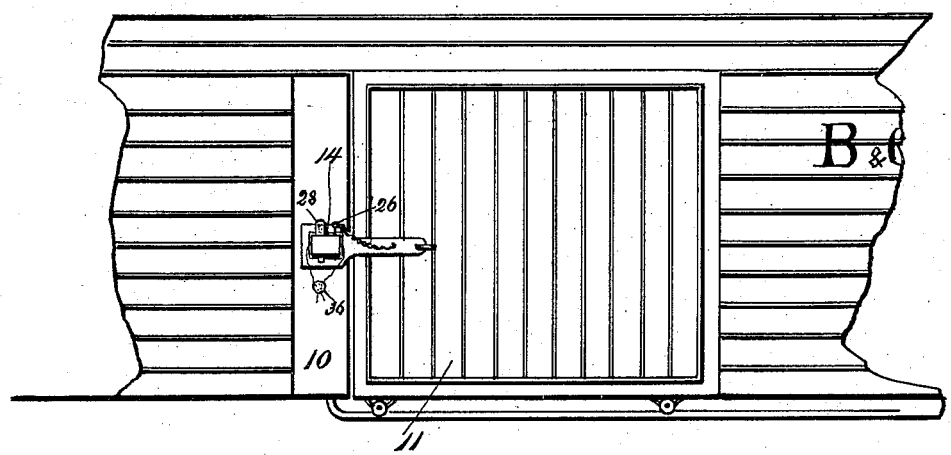
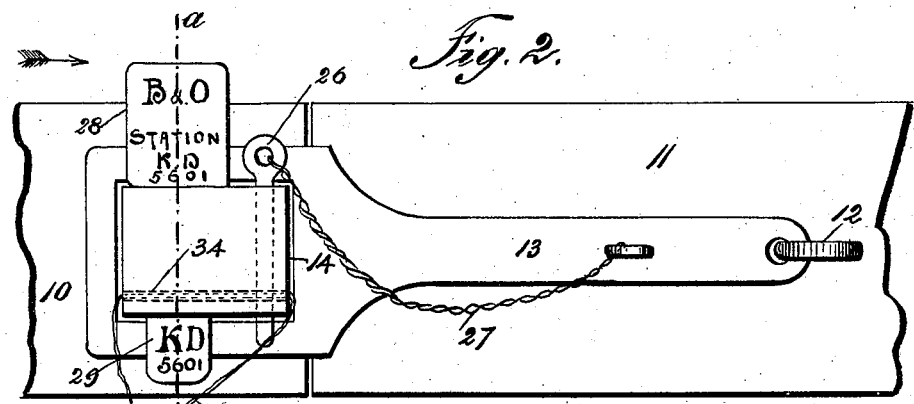
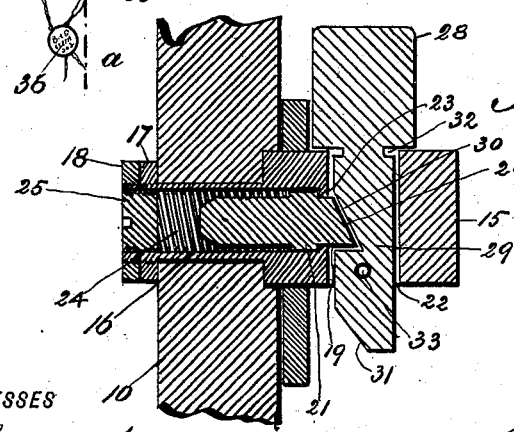
WITNESSES
INVENTOR
Henry T. Jones
BY
Edgar Tate & Co.
ATTORNEYS

UNITED STATES PATENT OFFICE.

HENRY TYLER JONES, OF LONG ISLAND, QUEENS COUNTY, NEW YORK.

SEAL-LOCK.

SPECIFICATION forming part of Letters Patent No. 700,502, dated May 20, 1902.

Application filed July 25, 1901. Serial No. 69,628. (No model.)

*To all whom it may concern:*

Be it known that I, HENRY TYLER JONES, a citizen of the United States, residing at Long Island, in the county of Queens and State of New York, (whose post-office address is East Setauket, Long Island, New York,) have invented certain new and useful Improvements in Locking and Sealing Devices for Cars, of which the following is a full and complete specification, such as will enable those skilled in the art to which it appertains to make and use the same.

The object of my invention is to provide a locking and sealing device for car-doors, &c., of a new, simple, and cheap form of construction, by the use of which a car-door or other like device to be locked and sealed may be so locked and sealed without the use of any special sealing-tool and which can only be thereafter opened by the breaking and fracturing of the seal.

To such ends my invention consists, in substance, of a staple or eyebolt, means for securing such staple or eyebolt to the door-jamb, a slant-faced catch-bolt reciprocating in the main body portion of the staple or eyebolt, the catch end of which extends into the slot or eye of the eyebolt or staple, a spring for normally forcing the catch-bolt into such slot or eye, a hasp and means for securing the same to the door, a frangible seal having a bar portion adapted to enter the eye or slot of the bolt or staple, the lower end of which bar is slant faced or pointed, so as to press back the catch-bolt on being inserted in such slot or eye of the eyebolt or staple, which frangible seal is provided with a lock seat or slot adapted to receive the end of such catch-bolt, so as to prevent withdrawal of the seal when once inserted in the eye or slot, a head larger than the bar portion of the seal formed integral therewith, a station-number or indicating-mark, and an individual number carried by the seal at the head end, duplicates of such numbers and marks carried by the seal adjacent to the point of the bar, a metallic locking-pin adapted to pass through a perforation provided for it in the bolt or staple, so as to lock the hasp thereon in such manner as to prevent the same from being brought into contact with the frangible seal, and means for securing such pin so as to prevent loss thereof, the seal being usually and preferably but not necessarily formed of baked clay and being provided with a perforation registering when the seal is in position in the eye or slot of the eyebolt or staple, with a like perforation formed therethrough through both of which may be passed the wire of a lead or like seal in order to form a secondary or additional seal, although it is not to be understood that the invention is limited to a device necessarily comprising at once all of the devices or means before mentioned, as the invention consists of certain various combinations or arrangements of devices and parts and the construction of certain devices and parts, all substantially as hereinafter more particularly set forth in the specification, and pointed out in the claims.

In the accompanying drawings, forming part of this specification, in which like letters of reference designate corresponding parts in the several views, Figure 1 is a front view of a door and a portion of the side of an ordinary freight-car, showing the same provided with my improved form of locking and sealing device. Fig. 2 is a view in detail, upon an enlarged scale, of such locking and sealing device in the locking position; and Fig. 3 is a view of the same in vertical section on the line *a a* of Fig. 2, looking to the right in the direction of the arrow in said Fig. 2.

In the drawings, 10 designates the door-jamb, and 11 the car-door. Secured to the door, as shown, by a staple 12 or in any desired manner, so as to form a hinged joint, is a hasp 13, having an enlarged headed end provided with a suitable rectangular opening 14, adapted to pass over the enlarged eyed or slotted rectangular head portion 15 of the slotted eyebolt or staple, which is provided with a rearwardly-extending circular hollow main body portion 16, provided at the extreme inner end with both inner and outer screw-threads, the door-jamb 10 having a circular opening provided at the outer end with a square chamfer to receive a portion of the head 15, so as to prevent turning of such eye or staple bolt, and the same being secured in such door-jamb by a securing-nut 17 and a lock-nut 18, screwed upon the exterior thread within the door-jamb, as shown in Fig. 3.

Reciprocating in the hollow central portion of the staple or eye bolt is a catch-bolt 19, of the form of a spring latch-bolt usually employed in door-locks, provided with a forward slant-faced portion 20, behind which is the rectangular portion 21, fitting in a like square portion formed in the outer end of the otherwise circular hollow portion of such eyebolt, such catch-bolt being prevented from being forced too far into the eye or slot 22 of the eyebolt by a projecting flange 23 at the forward side of such eyebolt and being normally forced into the position shown in Fig. 3 by a suitable spiral spring 24, which is compressed between the rear edge of the rectangular portion 21 thereof and a screw-plug 25, which is screwed into the inner female screw-thread in the rear end of said eye or staple bolt, as shown in such Fig. 3.

Formed in and through the eyebolt, to one side of the main slot 22 thereof, is a similar slot or passage adapted to receive a metallic securing-pin 26, usually secured to the hasp 13 by a chain 27, which passage and eye-pin are so situated and of such size that there is just room between the same and the door-jamb when the parts are in the position shown in Fig. 3 to allow of the insertion of the pin 26 in the position shown in Fig. 2, so as to lock the hasp 13 in position and prevent the same from coming into contact with the head portion 28 of the frangible seal. The frangible seal consists of an enlarged head portion 28 and a smaller bar portion 29, usually of the rectangular form shown, as is the eye 22 of the head 15 of the eyebolt or staple; but in any event the bar portion 29 is of the exact shape of such eye or slot, and such bar portion 22 is provided on one side with a catch-slot 30 of the form of the head of the catch-bolt 19, so as to receive the same when in the position shown in the drawings, such bar being pointed or provided with a slant face 31 at the bottom, by which upon being inserted from the top the same will force back the catch-bolt 19 until the catch-slot 30 comes in registry therewith, when the spring 24 will force the same into the position shown in Fig. 3, after which, as will be seen, it will be impossible to withdraw the seal without fracturing the same, and in order to facilitate this fracturing and that the seal may be cleanly broken into two pieces only, which may be preserved for future reference, such seal is usually provided just below the head 28 with an annular groove 32, as shown in Fig. 3. Such seal is also usually provided at the bottom with a transverse perforation 33, adapted when the parts are in position to register with a like perforation 34 through the head 15 of the eye or staple bolt, through both of which may, if desired, be passed a wire 35, provided with a lead seal 36 of the well-known form, by which arrangement it will be seen that two seals instead of one are provided. Upon the frangible seal any suitable indicating number or marks may be printed or impressed, and when such seal is made of soft frangible wood the same may be burned or branded thereon with a hot iron; but when formed, as I prefer to form such seal, of baked clay such indicating mark or marks are impressed thereon while soft and before baking. The seal may, if desired, be colored any preferred color during the process of baking. In practice such seals are usually provided, as shown, upon the head at the top with the name of the railroad using the same, in this instance designated by the letters "B. & O.," the station using that particular seal being indicated by name or, as is usually the case, as shown in the drawings, by two or more letters, in this case being indicated by the letters "K. D.," and each individual seal of each particular station is provided with an individual number, in this case such number being "5601," and I prefer to provide such seal upon the bottom forward portion which projects below the head 15 with duplicates of the individual and station numbers or marks, as shown in Fig. 2. When so numbered and formed with the groove 32, it will be seen that by merely striking the head 28 of such seal a quick sharp blow upon the side the head will be broken off at such groove, when the lower portion 29 in the slot may be pushed down past the catch, after which, the pin 26 being taken out, the hasp 13 may be removed from the staple-bolt and the door opened, and the two ends of the seal, the two pieces of which will exactly fit one another at the fracture, may, if desired, be preserved for future reference.

Having fully described my invention, what I claim as new, and desire to secure by Letters Patent, is—

1. A device of the class described comprising a hasp provided with a head having an opening, a tubular staple-bolt provided with a head adapted to pass through said opening and having a vertically-arranged eye or passage formed therein, a frangible seal comprising a head portion and shank, the latter being adapted to pass through said eye or passage and a spring-operated latch-bolt mounten in said staple-bolt and adapted to engage the shank of the seal, and a securing-pin connected with the hasp and adapted to be passed through the head of the staple-bolt, substantially as shown and described.

2. A device of the class specified comprising a hasp provided with a head having an opening, a tubular staple-bolt provided with a head adapted to pass through said opening and having a vertically-arranged eye or passage therein, a frangible seal comprising a head portion and shank, the latter being adapted to pass through said eye or passage and a spring-operated latch-bolt mounted in said staple-bolt and adapted to engage the shank of the seal, the shank of the seal being also provided with a triangular notch or recess and the head of the latch-bolt being beveled on the upper side thereof, substantially as shown and described.

In testimony that I claim the foregoing as my invention I have signed my name, in presence of the subscribing witnesses, this 22d day of July, 1901.

HENRY TYLER JONES.

Witnesses:
F. A. STEWART,
L. R. BAYER.